Sept. 27, 1955         J. A. FREDERICK         2,719,046
                        LOCKING COLLAR
                       Filed June 21, 1950
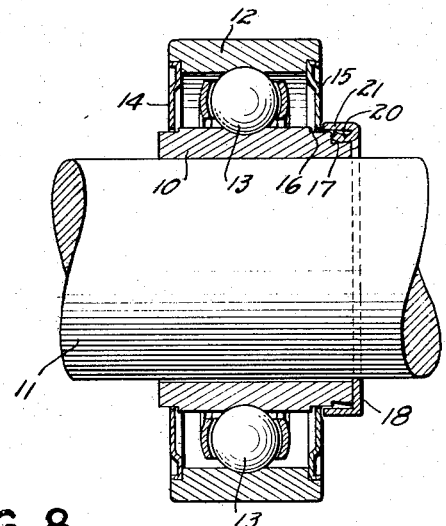
FIG. 1.
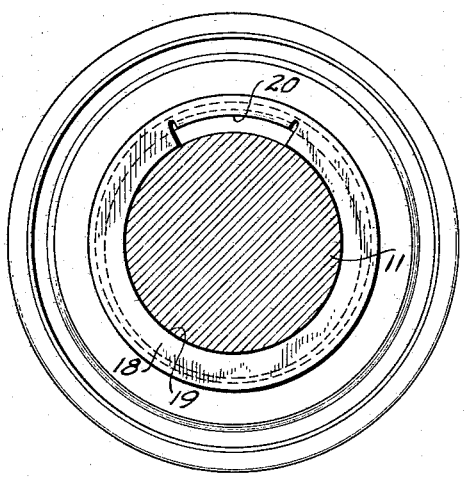
FIG. 2.
FIG. 8.  FIG. 9.  FIG. 4.  FIG. 5.  FIG. 7.
                                    FIG. 6.
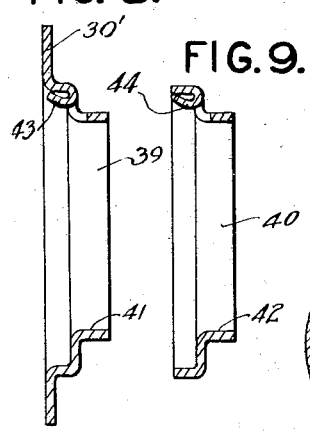
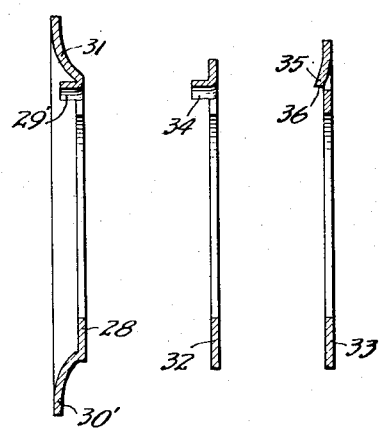
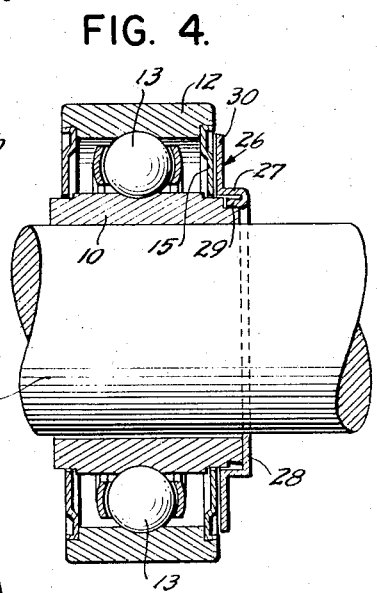
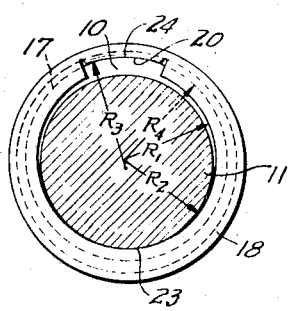
FIG. 3.
Inventor
JOHN A. FREDERICK
By Mitchell Berhert
Attorneys

United States Patent Office 2,719,046
Patented Sept. 27, 1955

2,719,046

LOCKING COLLAR

John A. Frederick, Meriden, Conn., assignor to The Fafnir Bearing Company, New Britain, Conn., a corporation of Connecticut Application June 21, 1950, Serial No. 169,424

5 Claims. (Cl. 287—52.09)

My invention relates to self-locking means for anchoring an inner bearing ring or the like to a shaft.

It is an object of the invention to provide an improved means of the character indicated.

It is another object to provide an improved self-locking means of the character indicated wherein a minimum of additional axial length is required for the locking means.

It is a general object to meet the above objects with a relatively inexpensive construction that may be fabricated from sheet metal, which may cooperate with standard inner bearing rings, and which may require no modification of such standard inner bearing rings.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a longitudinal sectional view of an antifriction bearing mounted upon a shaft and arranged for anchoring thereto by locking means characteristic of the invention;

Fig. 2 is a right-end view of the assembly of Fig. 1;

Fig. 3 is a fragmentary right-end view of the locking means but with certain curvatures and clearances exaggerated for clarity;

Fig. 4 is a vertical sectional view of an antifriction bearing locked to a shaft with modified locking means of the invention; and Figs. 5–6–7–8–9 are longitudinal sectional views of further modifications of the locking means of the invention.

Briefly stated, my invention contemplates an improved locking ring for locking an inner ring or the like to a shaft by means of relative rotation of eccentric locking parts. The inner bearing ring may be of standard configuration and include an eccentrically formed locking surface at one axial end. In the forms to be described, the eccentric locking surface is an outer surface of the inner bearing ring, and the bind established by the locking ring is between a point on the eccentric locking surface and a diametrically opposite point on the shaft. The locking ring may be formed of sheet metal and may comprise an annular member including a substantially circumferentially continuous radial surface, with a flange or lug struck out of a part of the member; the flange or lug may include a part axially offset from the plane of the radial surface, for binding engagement with the eccentric locking surface of the inner bearing ring. The locking ring may further include an axial flange, and the locking lug may be bent under this axial flange. If desired, for further bearing-sealing effectiveness, a flinger flange may be integrally formed with the axial flange, or an axially offsetting section other than an axial flange may join the flinger flange to the radial surface from which the lug is struck.

Referring to Figs. 1 and 2 of the drawings, my invention is shown in application to the locking of an inner bearing ring 10 to a shaft 11. The ring 10 may be part of an antifriction bearing, which may also include an outer bearing ring 12 spaced from the ring 10 by antifriction elements 13. If desired, seal means 14—15 may be carried by the outer bearing ring and may extend into close clearance relation with the inner ring 10; in the form shown, the seal means 15 extends into radially and axially close clearance relation with a cylindrical shoulder 16 near one end of the ring 10. At said end, the ring 10 may also be formed with an eccentric locking surface 17, which is shown to face radially outwardly and to flare outwardly at the locking end of the ring 10.

In accordance with the invention, novel sheet-metal locking means may be employed to anchor the ring 10 to the shaft 11. Such locking means may include a generally radially directed flange or surface 18 having a bore 19 which may closely clear the shaft 11. An axial flange 21 may be turned up on the annular disk or flange 18 and one of these flanges has a part doubled over to form a locking lug for engagement with the eccentric surface on the inner ring. In the form illustrated at essentially one part of the locking ring the material of said surface 18 is pierced, and a lug 20 is struck out so as to provide a locking means axially offset from the general plane of the surface 18. The lug 20 should be radially disposed intermediate the maximum and minimum radial offsets of the surface 17 with respect to the axis of the bore of the bearing ring 10. Thus, it will be clear that upon relative rotation of the inner bearing ring and of the ring 18, the lug 20 may engage and bind upon the eccentric locking surface 17, and, simultaneously, the bore 19 may engage and bind upon the shaft 11 at a diametrically opposite location.

The lug 20 may be struck, as shown in Figs. 1 and 2, out of a part of the bore 19 and may be generally arcuately formed, as shown in Fig. 2. For appearance's sake, and to provide radial reinforcement to the lug 20, I prefer that the locking ring 18 shall additionally include the circumferentially continuous axial flange 21. The flange 21 and the radial surface 18 may thus be said to be axial and radial flanges, and the lug 20 preferably is axially coextensive with at least a part of the axial flange 21; in fact, for reinforcement purposes, the free end of the lug 20 preferably contacts the inner surface of the axial flange 21, as shown clearly in Fig. 1.

In Fig. 3, I show how a "sticky" engagement of the binding surfaces may be achieved by employment of suitably proportioned clearances and curvatures in the ring of Figs. 1 and 2. In accordance with the showing of Fig. 3, the bind, as at 23, between the shaft 11 and the locking ring 18 is achieved between relatively diverging surfaces; this result may clearly be achieved by providing the bore of the locking ring 18 with a radius $R_1$ in excess of the radius $R_2$ of the shaft 11. I also prefer that the point of binding contact 24 between the lug 20 and the eccentric locking surface 17 shall be achieved between relatively diverging surfaces; thus, for the circularly formed surfaces shown, I prefer that the radius $R_3$ of the inner part of the lug 20 shall exceed the radius $R_4$ of the eccentric locking surface 17. Stated in other words, the minimum offset of the eccentric locking-ring surface 20 may be said to be intermediate the maximum and minimum offsets of the locking surface 17 of the bearing ring 10.

In Fig. 4, I show a modified arrangement of the invention wherein a locking ring 26 is employed to anchor the inner bearing ring 10 to the shaft 11. The ring 26 may, as in the case of the ring of Fig. 1, include an axial flange 27 integral with a radial flange 28, and a locking lug 29 may be struck out of the bore of the radial flange 28. However, in order to increase the sealing effectiveness of the seal means 15 of the antifriction bearing, the locking means 26 may additionally include another radial flange 30 which may serve as a flinger and which preferably extends radially for substantially the distance between the inner and outer bearing rings 10—12 and in close axial-clearance relation with the seal means 15.

In Fig. 5, I show a modified arrangement of a combined locking ring and flinger. In the arrangement of Fig. 5, the ring may again include a radial flange 28' and another substantially radially extending flange 30' to serve as the flinger. The flanges 30'—28' are preferably axially offset, and, for appearance's sake, I have provided a tapering section 31 as the offsetting means. Again, the locking lug 29' may be struck out of the inner radial flange 28'.

In Figs. 6 and 7, I show locking means in accordance with the invention, as reduced perhaps to simplest terms. In each case, the basic locking ring may be an annular disc or washer 32 (Fig. 6) —33 (Fig. 7). The eccentric locking lug characteristic of the other described forms may be merely struck out of the body of one of the discs 32—33; in the form shown in Fig. 6, the locking lug 34 is caused to extend in a generally axially projecting direction and functions substantially as described for the other forms, and in Fig. 7 the locking lug 35 is merely slightly axially displaced out of the body of the annular ring 33 and the lock 35 may be described as essentially a radially directed lug. In a suitable piercing operation, it will be appreciated that the bottom edge 36 of the lug 35 may be formed so as clearly and positively to engage the locking shoulder 17 on an inner bearing ring. At the same time, it will be appreciated that formation of the lug 35 may result in substantially no change in external appearance of the ring 33; in fact, the ring 33 may be for practical purposes, considered as a substantially continuous locking ring.

In Figs. 8 and 9, I show further slight modifications of the arrangements of Figs. 4 and 1, respectively, the locking ring of Fig. 8 being formed with a flinger 30' and the ring of Fig. 9 without a flinger. In each case, the bore in which the shaft is received is extended or tubular (at 39—40) so as to provide a more longitudinally extensive contact area, at 41—42, with the shaft, in opposition to the contact of lugs 43—44 with the eccentric locking surface 17 on the inner bearing ring. For a continuous external appearance and for a uniform peripheral stressing of the extended tubular parts 39—40, I prefer that the outer rim be continuous and that the lugs 43—44 therefore be punched out of the body, as shown, so as to leave a slight opening, as at 45.

It will be appreciated that I have described improved means for securely locking a bearing element to a shaft. My locking means may automatically improve locking effectiveness with use, and a minimum additional axial length is involved in setting the lock. My locking means is simple to use and cheap to manufacture, and no modification of standard end-locking bearing rings need be involved.

While I have described my invention in detail for the preferred forms shown, it will be understood that modifications may be made within the scope of the invention as defined in the appended claims.

I claim:

1. As an article of manufacture, a locking ring for anchoring an inner bearing ring or the like to a shaft, said inner bearing ring having at one axial end an eccentric locking shoulder, said locking ring comprising an annular member including integrally joined generally axial and radial flanges, and a lug bent out of said radial flange and back on the axial flange to form an eccentric lug to fit said locking shoulder.

2. As an article of manufacture, a locking ring for anchoring an inner bearing ring or the like to a shaft, said inner bearing ring having at one axial end an eccentric locking shoulder, said locking ring comprising two radial flanges with circumferentially extending means integrally joining said flanges in axially spaced relation, one of said flanges including an integral lug bent back onto said circumferentially extending means to form an eccentric lug to fit on said locking shoulder.

3. An article according to claim 2, in which one of said flanges is radially inwardly of the other of said flanges, and in which said lug is formed out of said inwardly disposed flange, whereby said other flange may serve as a circumferentially continuous flinger in cooperation with the bearing.

4. As an article of manufacture, a locking ring for locking an inner bearing ring or the like to a shaft, said bearing ring having at one axial end an eccentric locking shoulder, said locking ring comprising an annular member to fit over a shaft and including generally axial and radial integral flanges, one of said flanges having an integral lug bent back onto said generally axial flange to form an eccentric lug to fit said locking shoulder.

5. As an article of manufacture, a locking ring for locking an inner bearing ring or the like to a shaft, said bearing ring having at one axial end an eccentric locking shoulder, said locking ring including a generally radial flange member to engage the end of the bearing ring, said flange member having an aperture to receive a shaft, said flange member having a pair of slits extending from the shaft aperture radially outwardly and defining a lug, said lug being bent so as to lie in a generally axial line to provide an eccentric lug to fit said eccentric shoulder.

References Cited in the file of this patent

UNITED STATES PATENTS

| | | |
|---|---|---|
| 827,267 | Schmidt | July 31, 1906 |
| 1,272,714 | Reinhalter | July 16, 1918 |
| 1,788,891 | Runge | Jan. 31, 1931 |
| 1,909,230 | Smith | May 16, 1933 |
| 2,102,375 | Morton | Dec. 14, 1937 |
| 2,269,132 | Soderqvist | Jan. 6, 1942 |
| 2,273,379 | Searles | Feb. 17, 1942 |
| 2,284,081 | Beggs | May 26, 1942 |
| 2,290,484 | Potter | July 21, 1942 |
| 2,419,885 | Cooper | Apr. 29, 1947 |